(12) United States Patent
Ciochina et al.

(10) Patent No.: US 11,777,571 B2
(45) Date of Patent: *Oct. 3, 2023

(54) COMMUNICATION DEVICES AND METHODS WITH HYBRID BEAMFORMING

(71) Applicant: Sony Group Corporation, Tokyo (JP)

(72) Inventors: Dana Ciochina, Stuttgart (DE); Thomas Handte, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,376

(22) Filed: Jan. 18, 2022

(65) Prior Publication Data

US 2022/0140876 A1 May 5, 2022

Related U.S. Application Data

(63) Continuation of application No. 16/604,579, filed as application No. PCT/EP2018/059503 on Apr. 13, 2018, now Pat. No. 11,258,496.

(30) Foreign Application Priority Data

Apr. 13, 2017 (EP) .................................... 17166523

(51) Int. Cl.
*H04B 7/06* (2006.01)
*H04B 7/0456* (2017.01)
*H04B 17/12* (2015.01)

(52) U.S. Cl.
CPC ......... *H04B 7/0617* (2013.01); *H04B 7/0456* (2013.01); *H04B 7/0626* (2013.01); *H04B 7/0634* (2013.01); *H04B 17/12* (2015.01)

(58) Field of Classification Search
CPC .... H04B 7/0617; H04B 17/12; H04B 7/0456; H04B 7/0626
See application file for complete search history.

(56) References Cited

U.S. PATENT DOCUMENTS 9,300,371 B1    3/2016  Zhang et al.
9,516,602 B2 *  12/2016 Kim ..................... H04B 7/0639
(Continued)

FOREIGN PATENT DOCUMENTS

CA       2542445 A1    10/2007
CN     105933049 A     9/2016
(Continued)

OTHER PUBLICATIONS

Sony, "On Elevation Beamforming/Full-Dimension (FD)MIMO for LTE", 3GPP TSG RAN WG1 #78 BIS R1-144056, Sep. 27, 2014, Ljubljana, Slovenia.
(Continued)

*Primary Examiner* — Raj Jain
(74) *Attorney, Agent, or Firm* — XSENSUS LLP

(57) ABSTRACT

A communication device for RF-based communication with another communication device comprises digital beamforming circuitry configured to perform digital beamforming based on digital beamforming information to obtain RF data streams, and analog beamforming circuitry configured to perform analog beamforming for the obtained RF data streams. The analog beamforming circuitry is configured to perform analog beamforming training with the other communication device enabling the other communication device to compute the digital beamforming information corresponding to one or more combinations of analog beams used in said analog beamforming training. The digital beamform-
(Continued)

ing circuitry is configured to receive the computed digital beamforming information and to use it for performing the digital beamforming.

22 Claims, 8 Drawing Sheets

(56) References Cited

U.S. PATENT DOCUMENTS

| | | | |
|---|---|---|---|
| 9,614,594 B2 | 4/2017 | Kim | |
| 9,806,777 B1 | 10/2017 | Doostnejad et al. | |
| 9,853,702 B1 | 12/2017 | Liang et al. | |
| 10,644,781 B2 | 5/2020 | Su et al. | |
| 11,258,496 B2* | 2/2022 | Ciochina | H04B 7/0617 |
| 2013/0039401 A1 | 2/2013 | Han et al. | |
| 2013/0301454 A1 | 11/2013 | Seol et al. | |
| 2014/0355707 A1 | 12/2014 | Kim et al. | |
| 2015/0103934 A1 | 4/2015 | Nam et al. | |
| 2016/0013850 A1 | 1/2016 | Zhou et al. | |
| 2016/0080051 A1 | 3/2016 | Sajadieh et al. | |
| 2016/0142922 A1 | 5/2016 | Chen | |
| 2016/0278101 A1 | 9/2016 | Soldati | |
| 2016/0353294 A1* | 12/2016 | Wang | H04W 24/02 |
| 2017/0111149 A1* | 4/2017 | Kim | H04B 7/0617 |
| 2018/0191417 A1* | 7/2018 | Kim | H04B 7/04 |
| 2018/0269953 A1* | 9/2018 | Kang | H04B 7/0408 |
| 2019/0081682 A1* | 3/2019 | Wu | H04B 7/0482 |
| 2019/0089434 A1* | 3/2019 | Rainish | H04B 7/0617 |
| 2019/0140730 A1 | 5/2019 | Oteri et al. | |
| 2019/0215045 A1 | 7/2019 | Choi et al. | |
| 2019/0393948 A1 | 12/2019 | Zhao et al. | |
| 2020/0099428 A1 | 3/2020 | Ciochina et al. | |
| 2020/0195325 A1 | 6/2020 | Yuan | |
| 2022/0140876 A1* | 5/2022 | Ciochina | H04B 17/12 370/329 |

FOREIGN PATENT DOCUMENTS

| | | |
|---|---|---|
| EP | 3091681 A | 11/2016 |
| WO | 2014/193475 A1 | 12/2014 |
| WO | 2017/197189 A1 | 11/2017 |

OTHER PUBLICATIONS

International Search Report and Written Opinion dated Jun. 20, 2018 for PCT/EP2018/059503 filed on Apr. 13, 2018, 9 pages.

"Part 11: Wireless LAN Medium Access Control (MAC) and Physical Layer (PHY) Specifications", IEEE Standard for Information technology—Telecommunications and information exchange between systems Local and metropolitan area networks—Specific requirements, Enhancements For Very High Throughput In The 60 Ghz Band, IEEE Std 302.11ad™—2012, IEEE, NY, USA, Dec. 28, 2012, pp. 1-598.

Boyd et al., "Convex Optimization", Cambridge University Press, New York, USA, 2004, pp. 1-716.

Palomar, D. et al., "Joint Tx-Rx Beamforming Design for Multicarrier MIMO Channels: A Unified Framework for Convex Optimization", IEEE Transactions On Signal Processing, vol. 51, No. 9, Sep. 2003, pp. 2381-2401.

Wu et al., "Optimal Tx-BF for MIMO SC-FOE Systems", IEEE Communications Letters, vol. 17, No. 8, Aug. 2013, pp. 1-5.

"Part 11: Wireless 14 LAN Medium Access Control (MAC) and Physical Layer 15 (PHY) Specifications", Draft Standard For Information Technology—Telecommunications and Information Exchange Between Systems—Local and Metropolitan Area Networks—Specific Requirements, Enhanced throughput for operation in license-exempt bands above 45 GHz, IEEE P802.11ay ™/00.3, IEEE, NY, USA, Mar. 2017, pp. 1-212.

* cited by examiner

COMMUNICATION DEVICES AND METHODS WITH HYBRID BEAMFORMING

CROSS-REFERENCE TO RELATED APPLICATIONS

The present application is a continuation of U.S. application Ser. No. 16/604,579 filed Oct. 11, 2019, which is based on PCT filing PCT/EP2018/059503, filed Apr. 13, 2018, and claims priority to EP 17166523.5, filed Apr. 13, 2017, the entire contents of each are incorporated herein by reference.

BACKGROUND

Field of the Disclosure

The present disclosure relates to different communication devices, such as a mobile station and an access point, which are configured for RF-based communication with each other. The present disclosure further relates to corresponding communication methods.

Description of Related Art

Communication systems in the 60 GHz frequency range suffer from strong free space path loss, which increases with frequency. For instance, a 60 GHz communication system has roughly 22 dB higher attenuation compared to a communication system operating at 5 GHz. To overcome the increased path loss, 60 GHz or any mm-wave communication system employs beamforming, i.e. transmitter and/or receiver feature a steerable phased-array antenna (PAA), which can form directive beams towards the other communication device. Such beams have typically a high directivity and are spatially very narrow. The directivity in main direction increases with the number of antenna elements per PAA. In contrast, the half-power beam width (HPBW) defines the spatial width of a pattern decreases with increasing number of antennas. Thus, the more antennas per PAA, the higher the directivity and the smaller the HPBW. In order to make use of the PAA directivity for communications, beam alignment is crucial and of high importance for mm-wave communication systems and RF communication systems, methods and devices in general.

The goal of transmit beamforming techniques is to allow MIMO transmitters to simultaneously send multiple streams to one or more receivers, based on the channel states, such that an adequate reception can be achieved. As compared to the sub 6 GHz, mm-wave channels pose many additional challenges on the design of transmit beamformers. Due to the very high frequency, mm-wave channels suffer from strong path loss, which can only be combatted by exploiting antenna arrays of multiple elements. However, the use of many antenna elements can have prohibitive complexity both due to hardware constraint as well as channel estimation burden. Therefore, hybrid antenna architectures where only a limited number of RF chains are employed to steer antenna arrays of multiple elements are more useful.

Single carrier (SC) transmission has been chosen by the developing mm-wave standards IEEE 802.1 lad and IEEE 802.1 lay as the mandatory modulation mode, due to the reduced complexity. However, since large chunks of spectrum are available and envisioned to be used in mm-wave channels, the channels will experience a certain frequency selectivity and equalization techniques are required. Frequency domain equalization (FDE) is a common equalization technique to reduce inter-symbol interference.

Thus, there is a need for transmit beamforming schemes which are more appropriate for the wideband SC mm-wave, without needing overly complicated filters at the transmitter or excessive FFT/IFFT blocks and taking into account the equalization scheme at the receiver.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide communication devices and corresponding communication methods enabling wideband SC mm-wave communication which do not require much additional or even complicated hard- or software, e.g. complex filters or FFT and IFFT blocks at the transmitter and which can be better adapted to the SC receiver structures.

According to an aspect there is provided a (first) communication device (also called initiator or transmitter), e.g. an access point, comprising:
  digital beamforming circuitry configured to perform digital beamforming based on digital beamforming information to obtain RF data streams, and
  analog beamforming circuitry configured to perform analog beamforming for the obtained RF data streams, and
wherein said analog beamforming circuitry is configured to perform analog beamforming training with the other communication device enabling the other communication device to compute the digital beamforming information for combinations of analog beams used in said analog beamforming training, and
wherein said digital beamforming circuitry is configured to receive the computed digital beamforming information and to use it for performing the digital beamforming.

According to a further aspect there is provided a (second) communication device (also called responder or receiver), e.g. a station, comprising:
  analog beamforming circuitry configured to perform analog beamforming training with the other communication device for determining analog beams for use in receiving said RF data streams, and
  digital beamforming computation circuitry configured to compute digital beamforming information based on a predetermined metric computed for combinations of analog beams used in said analog beamforming training and to transmit the computed digital beamforming information to the other communication device enabling the other communication device to perform digital beamforming based on the digital beamforming information.

According to a further aspect there is provided a (third) communication device (which is an alternative to the first communication device) for RF-based communication with another communication device, comprising
  digital beamforming circuitry configured to perform digital beamforming based on digital beamforming information to obtain RF data streams, and
  analog beamforming circuitry configured to perform analog beamforming for the obtained RF data streams,
wherein said analog beamforming circuitry is configured to perform analog beamforming training with the other communication device enabling the communication device to compute the digital beamforming information corresponding to one or more combinations of analog beams used in said analog beamforming training, and wherein said digital beamforming circuitry is configured to use the computed digital beamforming information for performing the digital beamforming.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication methods, the disclosed computer program and the disclosed computer-readable recording medium have similar and/or identical further embodiments as the claimed communication devices and as defined in the dependent claims and/or disclosed herein.

One of the aspects of the disclosure is to provide low complexity digital beamforming, in particular precoding, for single user (SU) MIMO mm-wave single carrier communications and feedback schemes to allow the application of the scheme. The beamforming information for use in the digital beamforming at the transmitter is computed at a receiver, particularly based on channel information in the frequency domain, and is preferably translated into a wideband precoder to be used by the transmitter. The obtained solution is then fed back to the transmitter, for which purpose required signaling is disclosed in embodiments. The disclosed solution leverages on the one hand the low complexity of the single carrier transmission and on the other hand the advantages of equalization techniques e.g., frequency domain equalization at the receiver to combat inter-symbol interference.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
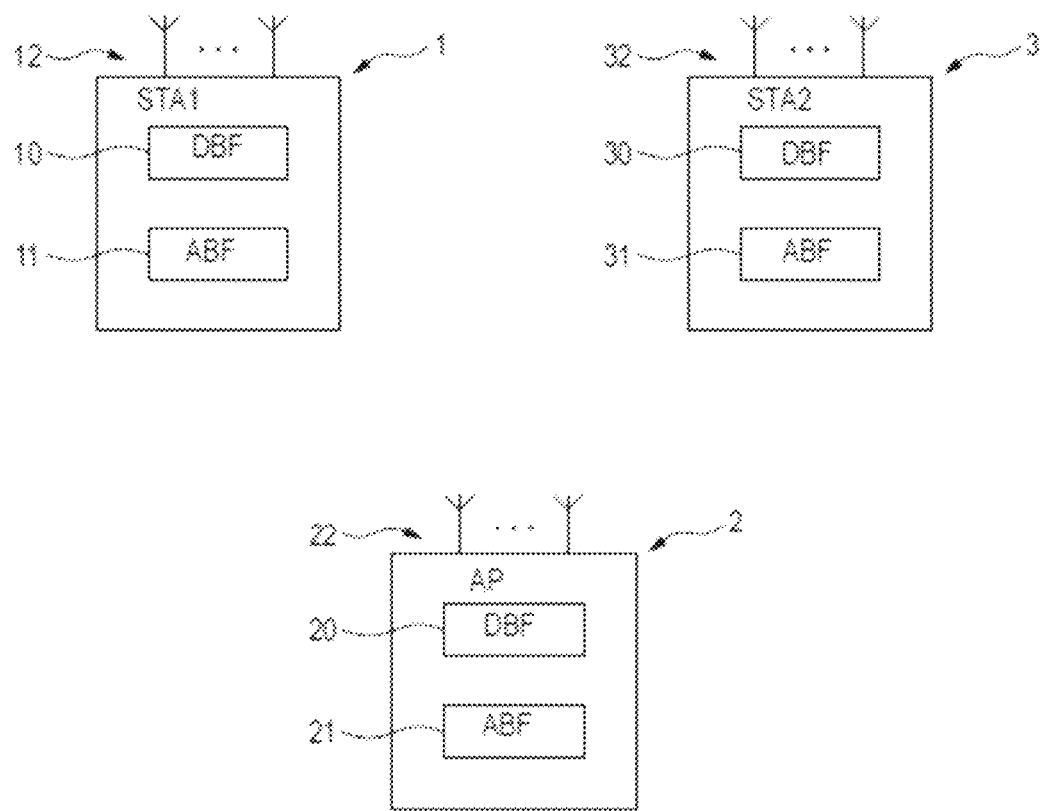
FIG. 1 shows a schematic diagram of a communication system including first and second communication devices according to the present disclosure.

Referring now to the drawings, wherein like reference numerals designate identical or corresponding parts throughout the several views, FIG. 1 shows a schematic diagram of a communication system 100 including first communication devices 1, 3 (stations STA1, STA2) and a second communication device 2 (an access point AP). The communication devices are generally configured to carry out RF-based communication with each other.

Each of said communication devices 1, 3, serving as receiver, generally comprises digital beamforming circuitry 10, 30 (also called digital beamformer or digital beamforming unit herein) configured to perform digital beamforming based on digital beamforming information to obtain RF data streams, analog beamforming circuitry 11, 31 (also called analog beamformer or analog beamforming unit herein) configured to perform analog beamforming for the obtained RF data streams, and antenna circuitry 12, 32 configured to transmit the obtained RF data streams using the analog beams formed by the analog beamforming circuitry. The analog beamforming circuitry 11, 31 is hereby configured to perform analog beamforming training with the other communication device enabling the other communication device to compute the digital beamforming information based on a predetermined metric computed for combinations of analog beams used in said analog beamforming training. The digital beamforming circuitry 10, 30 is configured to receive the computed digital beamforming information and to use it for performing the digital beamforming.

Said communication device 2, serving as transmitter, generally comprises antenna circuitry 22 configured to receive RF data streams, analog beamforming circuitry 20 configured to perform analog beamforming training with the other communication device for determining analog beams for use by the antenna circuitry to receive said RF data streams, and digital beamforming computation circuitry 21 configured to compute digital beamforming information based on a predetermined metric computed for combinations of analog beams used in said analog beamforming training and to transmit the computed digital beamforming information to the other communication device enabling the other communication device to perform digital beamforming based on the digital beamforming information.

The disclosed communication devices enable transmitting beamforming schemes which are more appropriate for the wideband SC mm-wave. Precoding matrices may be computed and fed back based on the assumption that the precoding is done per subcarrier or per group of subcarriers. This does, however, not hold in the case of SC mm-wave systems, which are of interest here. Further, known mm-wave systems do not contain structures to allow for the feedback and application of digital beamformers.

An embodiment of this disclosure refers to a wideband hybrid beamforming solution for SU MIMO, which can be easily applied on conventional SC mm-wave communication links. Aspects of the present disclosure include a decoupled training, in which in a first stage analog beamforming training is performed to find the phase shifters configuration that best expose the channel and promises the largest capacity and a second stage in which the digital beamformers are found at the receivers based on frequency domain channel state information. A further aspect refers to a method to obtain an optimal transmit precoder, which is constant over frequency, based on the channel information in frequency domain available at the receiver. Further aspects refer to heuristic solutions which can be used for easier practical implementations and feedback schemes, e.g. mapped to the IEEE 802.11ay signal flows and frame structure.

Figure 2:
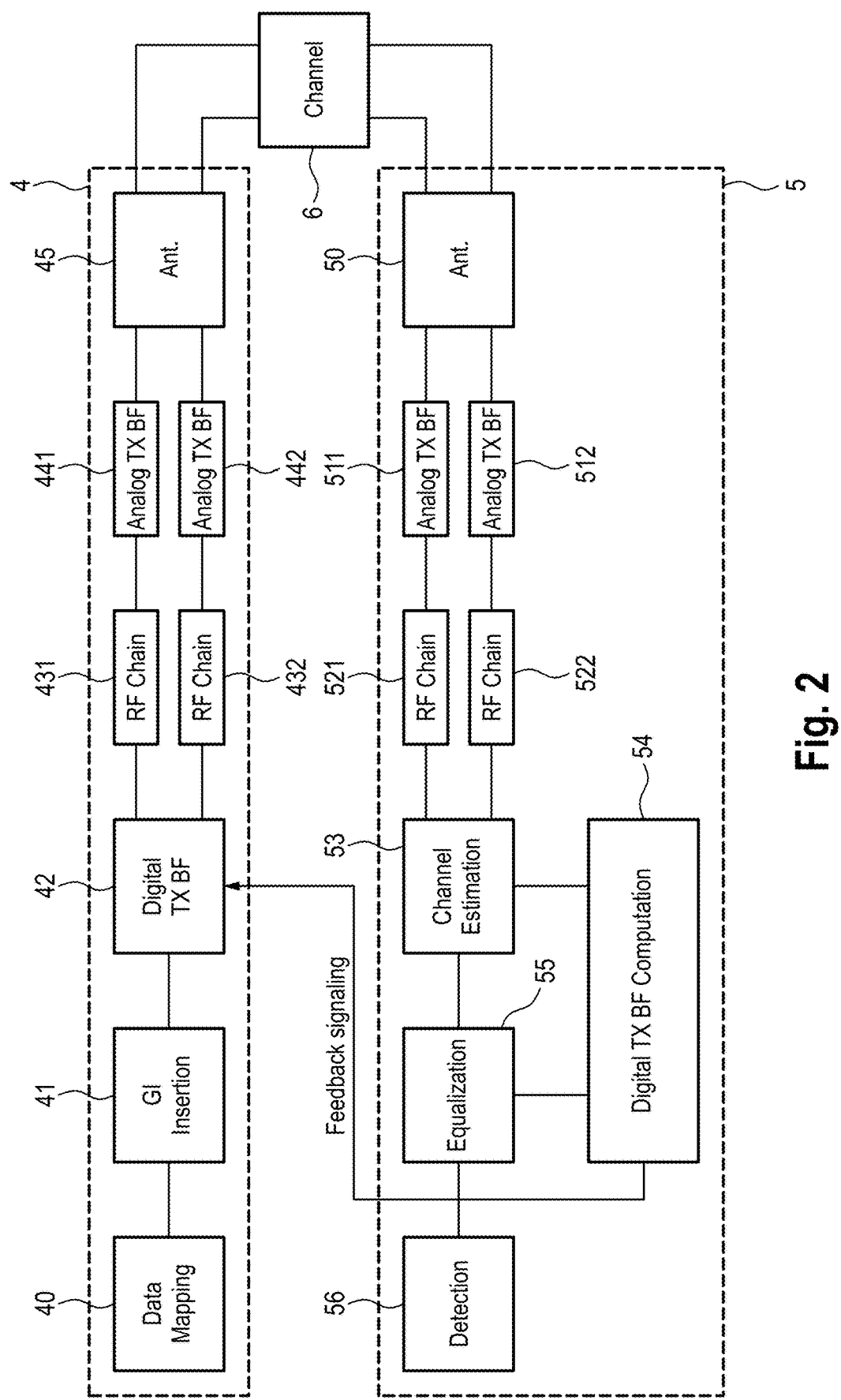
FIG. 2 shows a more detailed schematic diagram of a communication system including a first communication device and a second communication device according to the present disclosure.

FIG. 2 depicts a detailed schematic diagram of an embodiment of a communication system 200 including a first communication device 4 (e.g. an access point, AP, serving as transmitter) and a second communication device 5 (e.g. a station STA serving as receiver) according to the present disclosure.

The first communication device 4 comprises a data mapping unit 40, a guard interval insertion unit 41, a digital beamforming unit 42, several RF chains 431, 432 and, per RF chain, an analog beamforming unit 441, 442, and antenna unit 45. RF signals are transmitted over the channel 6 to the second communication device 5, which comprises an antenna unit 50, several RF chains 521, 522, an analog beamforming unit 511, 512 per RF chain, a channel estimation unit 53, a digital beamforming computation unit 54 an equalization unit 55 and a detection unit 56. The operation of the communication devices 4 and 5 will be explained in more detail below. The second communication unit 5 may further comprise, before the channel estimation, a guard interval removing unit and a DFT unit and, after the equalization, an IFFT unit (not shown).

Assume that $N_s$ streams are sent, which for ease of exposition are considered composed of just one block of M symbols and $N_c$-M guard interval symbols i.e., $$s_i[s_i^{(1)}, s_i^{(2)}, \ldots, s_i^{(M)}, s_i^{(M+1)}, \ldots, s_i^{(N_c)}].$$

For ease of exposition consider the transmitted symbol vector as $=[s_1^{(1)}, \ldots, s_M^{(1)}, s_1^{(2)}, \ldots, s_M^{(2)}, \ldots, s_1^{(N_c)}, \ldots, s_M^{(N_c)}]$. The transmitted signal is $x=P_A P_D s$, where $P_D$ and $P_A$ denote the transmit digital and analog beamforming matrices, respectively. More clearly, the analog matrix is represented as block diagonal, with all blocks equal, to model that the analog beamformer does not change during the transmission of a symbol block. On the other hand $P_D$ can model a filter with number of taps no larger than the guard interval length, thus it is chosen as a block circulant matrix. The received symbol after GI removal is $=W_A^H H P_A P_D s+n$, where $H=\text{blkcirc}([H^{(1)}, \ldots, H^{(L)}, 0^{(1)}, \ldots, 0^{N_c}])$ and $W_A$ is the receive analog beamforming matrix. $W_A^H$ is block diagonal matrix denoting the analog receive beamforming matrix. The effective channel which is seen after the analog transmit beamforming and receive beamforming can be written as $H_{eff}=\text{blkcirc}([W_{BA}^H H^{(1)} P_{BA}, \ldots W_{BA}^H H^{(L_{eff})} P_{BA}, 0^{(1)}, \ldots, 0^{N_c}])$, where L_eff represents the number of effective taps remaining after applying the analog beamforming operations $P_{BA}$ and $W_{BA}$ denote repeating diagonal blocks of the precoding matrix and combining matrix respectively.

For a given precoding matrix, the receive strategy that minimizes the MMSE is $$W_D=(I+P_D^H H_{f,eff}^H H^{f,eff} P_{BD}))^{-1} P_D H_{f,eff},$$

where $H_{f,eff}^H H_{f,eff}$ is a block diagonal matrix and each block k, corresponds to the channel matrix at subcarrier k. By imposing that the same digital transmit beamforming matrix is used for all subcarriers, is equivalent to assuming $P_D=P_{BD} \otimes I$ $$W_D=(I+(P_{BD}^H \otimes I) H_{f,eff}^H H_{f,eff} (P_{BD} \otimes I))^{-1} (P_{BD}^H \otimes I) H_{f,eff}^H.$$

The digital transmit matrix which both maximizes the rate and minimizes the MMSE can be found by solving the following optimization problem (1)

$$\max_{P_{BD}} \sum_{k=1}^{N_c} \log\det(I + P_{BD} H_{fk} H_{fk}^H P_{BD}^H) \text{ s. to } \text{Tr}\{P_{BD} P_{BD}^H\} \leq P.$$

Differently than conventional solutions, the mutual information maximization does not directly result from the SVD decomposition due to the coupling of $P_{BD}$ to all frequency domain channels. However, the mutual information maximization and the MMSE minimization are equivalent to a convex optimization problem, which can be solved within required precision by e.g. interior point solvers. To expose the convex structure, it can be noticed that problem (1) can be equivalently reformulated as an optimization problem in the positive semidefinite matrix $Q_{BD}$ as $$\max_{Q_{BD}} \sum_{k=1}^{N_c} \log\det(I + Q_{BD} H_{fk} H_{fk}^H) \text{ s. to } \text{Tr}\{Q_{BD}\} \leq P, Q_{BD} \succeq 0$$

Problem (2) represents a maximization of a concave function over a convex set, therefore is within the category of semi-definite problems, for which algorithms are known.

To verify that the solution is optimal various criteria can be used, e.g., based on KKT (Karush-Kuhn-Tucker) conditions or by imposing a duality gap smaller than a threshold. Suboptimal solutions can also be found based on projection methods. For example if the optimal solution for an unconstrained transmit beamforming matrix can be computed based on the channel information in frequency domain, e.g.

$$P_{BD}=\text{argmin}_{P_{BD}} d(P_D^*(P_{BD} \otimes I)),$$

where $P_D^*$ is the optimum precoding matrix defined for carrier cooperative or subcarrier based block diagonal and. d(*,*) represents a distance measure (can be norm 2 or Frobenius norm of the difference between the arguments or chordal distance). In both cases closed forms exist and are based on the CIRs (Channel Impulse Response) in the frequency domain. Another practical method to obtain the precoding matrix is to consider an average of the channel covariance matrix in frequency domain i.e., $$R = \frac{1}{N_c} \Sigma_k H_{fk} H_{fk}^H$$

and compute $P_{BD}$ as the eigenvector of this covariance matrix.

Figure 3:
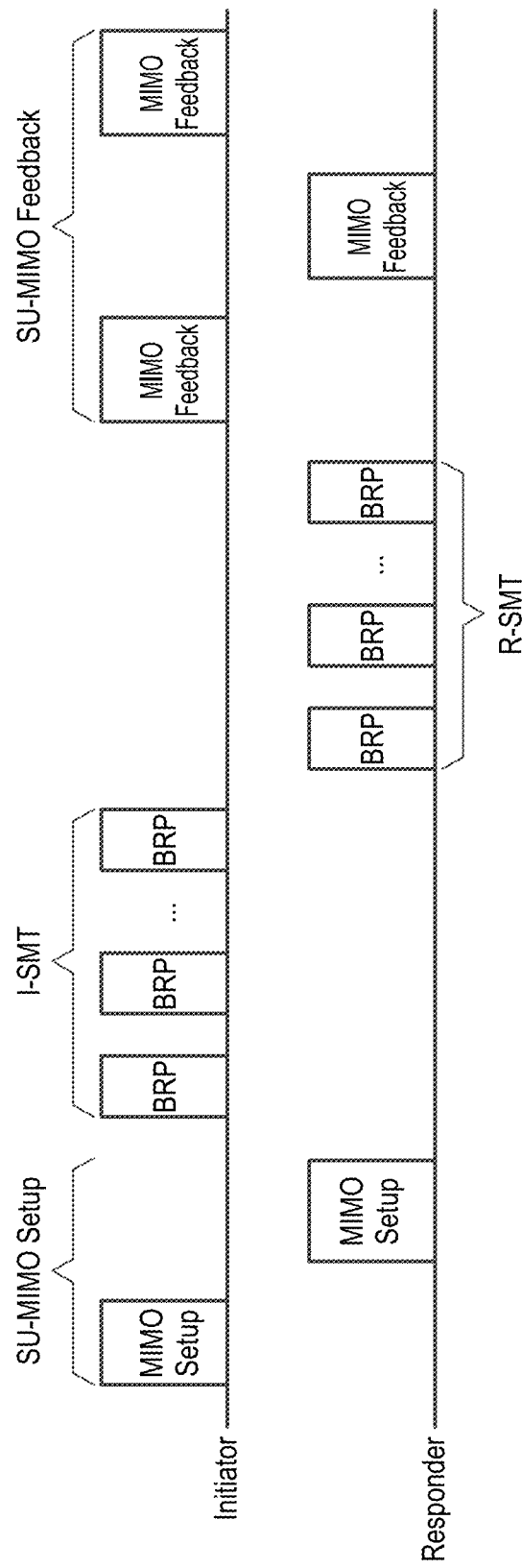
FIG. 3 shows a diagram illustrating a general embodiment of the operations of communication methods according to the present disclosure.

FIG. 3 shows a diagram illustrating an embodiment of current operations of communication methods according to the present disclosure. This method has been adopted to allow for the beamforming training. Within the MIMO Setup Frame various parameters for the future training stage are negotiated such as number of BRP frames to be sent, TX sectors to be tested, etc. During I-SMT (initiator SU MIMO training) the initiator (e.g. an AP, second communication device) sends BRP frames to train its analog beams. Similarly during R-SMT (responder SU MIMO training), the responder (e.g. a STA, first communication device) trains analog beams via BRP frames. Finally feedback information containing obtained values for the combinations of analog beams and channel measurements are fed back during the SU MIMO Feedback Phase. In the disclosed scheme, these stages can e.g. be used to find the most promising analog matrices $P_{BA}$ and $W_{BA}$, for $P_{BD}=I$, i.e., when no digital beamforming is applied at the transmitter.

To allow for digital beamforming schemes to be performed additions are made in embodiments of the disclosed devices and methods to the MIMO Setup frame and the MIMO feedback. Since computing the digital beamformers is a more tedious task, it is proposed to have the solution computed only for the best combination(s) of analog beams. Asking for the computation of the digital beamformers can be done within the MIMO Feedback frames and sent as proposed elements in further MIMO feedback frames or as proposed beamforming frames. One additional transmission can be performed at the end of the training as a BF (beamforming) poll, to allow the test of the newly formed digital beam. Further, a Digital BF SMT can be conceived, in which the AP transmits with both digital and analog beamforming.

Beamforming can be performed either by a STA or by an AP. If performed by a STA, then this can compute the precoding matrix that the AP should use and feedback. If computed by an AP, this needs to feed it back to the STA, such that this can adapt its receive beamforming scheme and equalizer filters. In any case, signaling is included for various purposes:

i) to indicate that digital beamforming training will be performed, ii) to indicate which of the communication devices is performing the beamforming matrix computation;

iii) to transmit the digital beamforming matrices (generally called beamforming information herein);

iv) optionally to indicate the format and required parameters of the digital precoders (should only one format be allowed, then this can be predefined e.g. in the communication devices and/or in a standard; and v) to indicate the capabilities of the devices to compute or apply digital precoders.

Several embodiments for the various kinds of signaling are further discussed below. These fall into two main categories:

a) All required signaling (i-iv) is performed with BRP (Beam Refinement Phase). Advantages are flexibility as well as possibility to request the digital beamforming only on particular BRP packets, or to require digital beamforming computation within a tracking process. A further advantage is that STAs can easily recommend application of digital BF based on the quality of the channels at their receivers or can request digital beamforming training together with RX beamforming training or simply digital beamforming training to be applied for the current analog beam combinations.

b) Required signaling is introduced in various parts in the MIMO training setup and MIMO feedbacks, according to the signal flow depicted in FIG. 3.

A first embodiment for implementing signaling uses a modification of the BRP frames. In this case the MIMO feedback is performed with the same type of frames, i.e., BRP frames, as the rest of the beamforming process (e.g., analog beam-training setup, analog beam feedback, channel measurement). The structure of the BRP frame is shown in Table 1 below, wherein in the blocks printed in bold letters some small modifications/additions are made.

TABLE 1

| BRP frame Action field format | |
|---|---|
| Order | Information |
| 1 | Category |
| 2 | Unprotected DMG Action |
| 3 | Dialog Token |
| 4 | BRP Request field |
| 5 | DMG Refinement element |
| 6 | Zero or more channel measurement feedback |
| 7 | EDMG BRP Request Element |
| 8 | Zero or more EDMG channel measurement Feedback |
| 9 | Zero or more Beamforming Feedback Elements |

The required changes for each of the blocks may be provided as illustrated in the following non-limiting exemplary embodiments:

i) Indication (also called "digital beamforming indicator" herein) that digital BF should be performed within the training: This can be included in the EDMG (enhanced directional multi-gigabit) BRP Request Element as follows:

| Element ID | Element Length | Element Extension | L-RX | L-TX-RX | Tx Sector ID | EDMG TRN Unit P | EDMG TRN Unit M | EDMG TRN Unit N | Digital BF Request | Reserved |
|---|---|---|---|---|---|---|---|---|---|---|

If the Digital BF Request is present then digital beamforming computation is performed on the next BRP packet for the analog beams with which the BRP packet is sent. The indication regarding the STA which is computing these matrices is inferred from the feedback type present in the Refinement Element, as shown further below.

ii) Indication (also called "decision indicator" herein) which communication device is performing the precoding computation: The presence or the request for channel measurement feedback can be indicated in the DMG Refinement Element depicted below. Similarly, the presence and request for digital beamforming feedback should also be indicated in this element as follows.

| B0 B7 Element ID | B8 B15 Length | B16 Initiator | B17 TX-train-response | B18 RX-train-response | B19 TX-TRN-OK | B20 TXSS-FBCK-REQ | B21 B26 BS-FBCK | B27 B28 BS-FBCK Antenna ID | B29 B33 FBCK-REQ |
|---|---|---|---|---|---|---|---|---|---|
| Bits: 8 | 8 | 1 | 1 | 1 | 1 | 1 | 6 | 2 | 5 |

| B34 B51 FBCK-TYPE | B52 MID Extension | B53 Capability Request | B54 B55 Reserved | B56 B59 BS-FBCK MSB | B60 BS-FBCK Antenna ID MSB | B61 B64 Number of Measurements MSB | B65 EDMG Extension Flag | B66 EDMG Channel Measurement Present |
|---|---|---|---|---|---|---|---|---|
| Bits: 18 | 1 | 1 | 2 | 4 | 1 | 4 | 1 | 1 |

| B67 Short SSW Packet Used | FBCK-REQ-Ext | FBCK-TYPE-Ext | Reserved |
|---|---|---|---|
| Bits: 1 | | | 2 |

A value of 1 in the FBCK-Req-Ext implies that requested feedback contains the digital beamforming matrix. If Digital BF Request=1 in the DMG Request Element and FBCKReq-Ext=1 in the DMG Refinement element, then the computation is being performed by the STA receiving the BRP packet, for the effective link corresponding to the analog beamformers utilized for receiving the BRP packet. Many implementations may prefer a computation with one beamforming matrix for the whole frequency band. However, if FIR precoding filters with multiple taps are desired, Ntaps can be re-interpreted as the number of non-null elements of the FIR precoding filter Ntaps_b, as generally there is no need for both channel feedback information and digital beamforming matrices.

If FBCK-Type-Ext is 1, beamforming feedback information (also called "precoding information" herein) is present within the packet. Further if this bit is set, however the Channel Measurement Present is 0 and Ntaps is non-null within the FBCK-Type the beamforming feedback contains multiple taps for an FIR filter corresponding to the chosen digital transmit beamformer.

iii) Feedback Content (also called "beamforming information" herein): The beamforming matrix can be contained in a newly defined field in the Channel Measurement Feedback Element, as shown in Table 2:

TABLE 2

EDMG Channel Measurement Feedback element format

| Field | | Size | Meaning |
|---|---|---|---|
| Element ID | | 8 bits | Defined in 9.4.2.1 |
| Length | | 8 bits | Defined in 9.4.2.1 |
| Element ID Extension | | 8 bits | Defined in 9.4.2.1 |
| EDMG Sector ID Order | Sector $ID_1/CDOWN_1$ | 11 bits | |
| | TX Antenna $ID_1$ | 3 bits | |
| | RX Antenna $ID_1$ | 3 bits | |
| | Sector $ID_2/CDOWN_2$ | 11 bits | |
| | TX Antenna $ID_2$ | 3 bits | |
| | RX Antenna $ID_2$ | 3 bits | |
| | ... | ... | |
| | Sector $ID_{Nmeas}/CDOWN_{Nmeas}$ | 11 bits | |
| | TX Antenna $ID_{Nmeas}$ | 3 bits | |
| | RX Antenna $ID_{Nmeas}$ | 3 bits | |
| Beam Tracking Feedback | TX Sector Combination 1 AWV 1 | 11 bits | Contains the AWV for TX DMG antenna 1 |
| | TX Sector Combination 1 AWV 2<<< | 11 bits | Contains the AWV for TX DMG antenna 2 |
| | ... | ... | |
| | TX Sector Combination 1 AWV $N_{TX}$ | 11 bits | Contains the AWV for TX DMG antenna $N_{TX}$ |
| | TX Sector Combination 2 AWV 1 | 11 bits | Contains the AWV for TX DMG antenna 1 |
| | TX Sector Combination 2 AWV 2 | 11 bits | Contains the AWV for TX DMG antenna 2 |
| | ... | ... | |
| | TX Sector Combination 2 AWV $N_{TX}$ | 11 bits | Contains the AWV for TX DMG antenna $N_{TX}$ |
| | ... | ... | ... |
| | TX Sector Combination $N_{meas}$ AWV 1 | 11 bits | Contains the AWV for TX DMG antenna 1 |

TABLE 2-continued

EDMG Channel Measurement Feedback element format

| | Field | Size | Meaning |
|---|---|---|---|
| | TX Sector Combination $N_{meas}$ AWV 2 | 11 bits | Contains the AWV for TX DMG antenna 2 |
| | ... | ... | |
| | TX Sector Combination $N_{meas}$ AWV $N_{TX}$ | 11 bits | Co<ntains the AWV for TX DMG antenna $N_{TX}$ |
| Digital TX BF Feedback | Digital TX Beamforming Matrix - | Ntaps_b × Nb1 × Nt × Nr + Ndelays × Nb2 × Nt × Nr | Defined in table 3 |

By default, the Transmit Beamforming matrix contains information on one digital precoding matrix, (i.e., Ntaps_b=1) displayed in compressed or uncompressed form. An example for uncompressed form is given in Table 3. This matrix is computed at the receiver, based on its equalizer and this operation can be performed with one of the methods shown above. For the examples above TX Digital BF 1 is the element of the first row and the first column of P_BD, written as real part followed by imaginary part. Nb1 and Nb2 represent the number of bits for quantization of each of the real part and the imaginary part of each beamforming tap and delay, respectively. In Table 3 N_CB denotes the number of bonded channel and T_c the chip rate.

TABLE 3

Digital TX BF Feedback Field

| | | | |
|---|---|---|---|
| Digital TX BF Feedback | TX Digital BF 1 | Ntaps_b × Nb1 | TX BF coefficient(s) for stream 1 to TX antenna 1 |
| | TX Digital BF 2 | Ntaps_b × Nb1 | TX BF coefficient(s) for stream 2 to TX antenna 1 |
| | ... | ... | ... |
| | TX Digital BF Ns × Nt | Ntaps_b × Nb1 | TX BF coefficient(s) for stream Ns to TX antenna Nt |
| Digital TX BF FIR Delays | TX Digital BF 1 Delays | Ntaps_b × Nb2 | Delays in units of T_c/N_CB between each two consecutive taps for stream 1 to antenna 1 |
| | ... | ... | ... |
| | TX Digital BF Ns × Nt Delays | Ntaps_b × Nb2 | Delays in units of $T_c/N_{CB}$ between each two consecutive taps for stream Ns to antenna Nt |

The Digital TX BF can be included as a field in the EDMG Channel Measurement Element or can be defined as a standalone feedback element. Alternatively, the precoding information can be signaled in compressed form by means of e.g., Givens rotation or codebook entry indices.

For ease of implementation and better similarity to the OFDM type feedback, also for the SC case the power of the beamformers (e.g. beamforming weights) for the specific streams can be separated from a unitary part. This means that the $P_{BD}$ matrices obtained at a receiver, with one of the methods disclosed herein can be decomposed as $$P_{BD} = \begin{bmatrix} SNR_1 & \cdots & 0 \\ \vdots & \ddots & \vdots \\ 0 & \cdots & SNR_{N_{SS}} \end{bmatrix} \begin{bmatrix} u_{11} & \cdots & u_{N_t,1} \\ \vdots & \ddots & \vdots \\ u_{1,N_{SS}} & \cdots & u_{N_t,N_{SS}} \end{bmatrix} \quad (1)$$

with $u_i=[u_{1,i}, \ldots u_{N_t,i}]^T$, the beamforming vector corresponding to the stream I being unit norm. In this case, the TX BF coefficient of stream j to antenna i is represented by the real part of $u_{ij}$, followed by the imaginary part as shown in Table 3' of the form below. In particular, an alternative to the SC BF feedback presented in Table 3 is shown in Table 3'. The SNR blocks can be provided within this element or separately contained in a channel measurement element.

TABLE 3'

Digital TX BF Feedback Field (alternative)

| | | | |
|---|---|---|---|
| SNR | SNR 1 | 8 | SNR for stream 1 |
| | SNR 2 | 8 | SNR for stream 2 |
| | SNR Nss | 8 | SNR for stream Nss |
| Digital TX BF Feedback | TX Digital BF 1 | 16 | TX BF coefficient(s) for stream 1 to TX antenna 1 |
| | TX Digital BF 2 | 16 | TX BF coefficient(s) for stream 1 to TX antenna 2 |
| | ... | ... | ... |
| | TX Digital BF Nss × Nt | 16 | TX BF coefficient(s) for stream Ns to TX antenna Nt |

To obtain the digital feedback, a digital BF initiator may transmit with an analog beamforming combination which has been chosen as part of the preceding analog beamforming training. It may use all TX antennas corresponding to the combination and attach to BRP frames enough TRN (training) fields to allow precise channel estimation at all the receive antennas of the responder (with desired tap resolution). Further, if necessary, the TRN fields may be multiplied with an orthonormal matrix T to allow a good estimation. For instance, the T matrix may correspond to a matrix with cyclic shift delays on the main diagonal.

After receiving a feedback in the form specified in Table 3', $u_{i,j}=\text{Re}\{u_{i,j}\}+j\text{Im}\{u_{i,j}\}$ is reconstructed and then $P_{BD}$ of dimension $N_{tx} \times N_{SS}$ is computed by the initiator, based on equation (1). The initiator will then use this information, i.e. $P_{BD}$, to build the digital beamforming matrix used by itself in the subsequent transmission $P_{BD}^{TW}$. The steering matrix that may be used by the transmitter is in this case $P_{BD}^{TX}=P_{BD}$ (if no T is applied) or a transformed matrix $P_{BD}^{TX}=T \cdot P_{BD}$, where T is an orthonormal matrix, which has been used during the transmission of the TRN fields used for the channel estimation of $H_{eff}=W_A H P_A$, based on which the design of $P_{BD}$ has been done.

iv) Format and parameter setup (also called "precoding indicator" herein; sometimes also called digital beamforming control information or precoding control information or precoding parameter information): Since currently the number of bits for quantization used for the channel measurement feedback is fixed and a format for the digital precoders is proposed that follows the format of the former, it is expected that these numbers will also be fixed for the latter. However, these numbers can be alternatively signaled and this is shown further hereinafter. Optionally if the transmitter has capabilities of adapting precoding coefficients by means of FIR filters, one precoding matrix can be defined per tap and delay according to the filter capabilities of the transmitter. The most precise form however is to further include a Digital BF Parameter Setup in the BRP Frame action as shown in Table 1, after the EDGM BRP Setup. Within the BF Feedback parameters setup the following may be present: format of the beamforming matrices (compressed or uncompressed), whether the beamforming matrices are represented in time domain (preferable for SC) or frequency domain (preferable for OFDM), Number of streams, Number of bits for quantization (Nb1, Nb2), an indication of whether digital beamforming is recommended and/or how much the performance increases based on the computed value of a predefined performance metric.

In an alternative embodiment to reusing the BRP frame a new frame is designed for the digital beamforming. A possible solution is shown in Table 4:

TABLE 4

| Digital Beamforming Frame | |
|---|---|
| 1 | Category |
| 2 | Unprotected DMG |
| 3 | Dialog Token |
| 4 | BF Feedback Parameters Setup Element |
| 5 | BF Feedback Element |

The BF Feedback parameters setup can be defined as proposed above, whereas for SC the BF Feedback Element contains after the Element ID and Length, the Digital BF Feedback Field as defined in Table 3.

A second embodiment for implementing signaling uses the MIMO Setup and MIMO Feedback structures as shown in FIG. 3. Similar to the description of the first embodiment using a modification of the BRP frame, particularly regarding beamforming feedback in the channel measurement feedback or as a separate frame, in this case the MIMO Training Control field is the one carrying FBType information, which contains information if Digital TX Beamforming is present and optionally information regarding the Ntaps and non-null Ndelays to indicate the length of the transmit filters and, respectively that Ndelay is present. Furthermore, in the FBType of the MIMO Control field, information about the number of bits for quantization Nb1, Nb2 can be present.

i) and iii) Indication that Digital Beamforming will be performed during the training and which communication device is performing the training would be in this case in the MIMO Setup:

TABLE 5

| MIMO Setup frame Action field format | |
|---|---|
| Order | Information |
| 1 | Category |
| 2 | Unprotected DMG Action |
| 3 | Dialog Token |
| 4 | EDMG BRP Request field |
| 5 | MIMO Setup Control element |
| 6 | One or more EDMG MIMO BRP Configuration elements |
| 7 | Zero or more TX BF Config Elements |

The MIMO Setup Control Element, shown in Table 6 contains among other information about communication device is the decision maker for a particular link and the type of feedback requested (in a MIMO-REQ-Field). In the case of digital beamforming this field additionally contains whether digital beamforming is considered in the training or not, e.g. signaled within a DigitalBF field. Furthermore the MIMO-Req-Field uses one field to request digital bf feedback. This serves in this case as decision indicator as follows: If DigitalBF=1 and DigitalBF_FBCK=1, the STA to which the packet is intended will compute the precoding information. If DigitalBF=1 and DigitalBF_FBCK=0 signals that the station sending the request will compute the precoding matrix for the particular link based on the channel measurement feedback.

The EDMG MIMO BRP Configuration Element contains the antenna weight vectors that are to be used.

TABLE 6

| MIMO Setup Control Element | |
|---|---|
| Field Name | Description |
| Element Specific Information | ID, Length, Extension |
| Initiator | Indicates if sender of the packet is the initiator of the bf training |
| L-Tx-Rx | Number of BRP packets |
| Link Type | Initiator or responder link |
| Decision Maker | Indicates if the sender of the packet is the decision maker for the link |
| Digital BF | Indicates that digital BF computation will be performed |
| MIMO-FBCK-Req | Type of Feedback Requested - updated to include Digital BF Request as shown below |
| MU Specific Info | Number of Groups/Users per Group |

MIMO FBCK Req with implicit information of the digital BF format may look as follows:

| Fields | SNR Request | Channel Measurement Request | Ntaps | EDMG Order Indication | TX combinations | Digital BF FBCK Request |
|---|---|---|---|---|---|---|

MIMO FBCK Req with explicit information of the digital BF format may look as follows:

| Fields | SNR Request | Channel Measurement Request | Ntaps | EDMG Order Indication | TX combinations | Digital BF Request | Digital BF Format |
|---|---|---|---|---|---|---|---| iii) The Digital Beamforming Feedback and Parameters: When the DigitalBF_FBCK Field is 1, the Ntaps field can be re-interpreted as the number of taps required for BF feedback, i.e. Ntaps=Ntaps_b. Another option is to include within the MIMO-Req-Field (within the MIMO Training Control defined in Table 6) specific information about the format of the required digital feedback: i.e., Ntaps_b and number of bits for quantization. Within the MIMO training control element, the number of streams that can be formed for the particular channel states can be additionally fed back.

TABLE 7

MIMO Feedback frame Action field format

| Order | Information |
|---|---|
| 1 | Category |
| 2 | Unprotected DMG Action |
| 3 | Dialog Token |
| 4 | MIMO Training Control element |
| 5 | One or more EDMG Channel Measurement Feedback elements |
| 6 | Zero or more Beamforming Feedback Elements |

The MIMO Feedback frame may additionally contain an indication of whether the receiver recommends the use of digital beamforming for a particular link, according to the channel states. Thus e.g., a responder may signal that for particular channel realization, the application of the digital beamformer does not produce a significant increase in performance. In this case it may not include the precoding matrix information in the feedback and due to the recommendation indication the initiator also does not re-attempt digital beamforming training for the particular channel. The performance metric based on which the recommendation is set can be defined as capacity gain, average SINR gain, MMSE, average MSE where gain is with digital beamforming applied relative to when only analog beamforming is applied.

In the following two exemplary embodiments for the communication between two communication devices 4 and 5 will be described.

Figure 4:
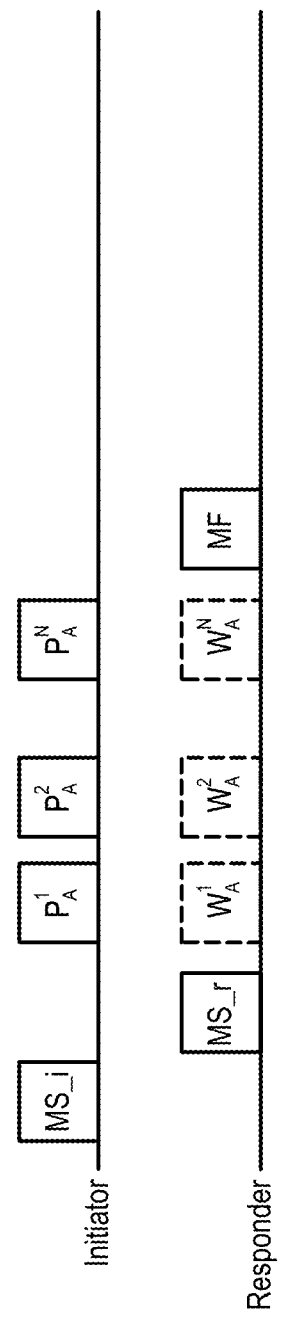
FIG. 4 shows a diagram illustrating a first exemplary embodiment of the operations of communication methods according to the present disclosure.

In a first exemplary embodiment illustrated in FIG. 4 the initiator wants to train the analog and digital beamformers for the initiator to responder link. In this example it is assumed that the decision maker for the initiator link is the responder and that the initiator relies on the responder's receiver to compute and feedback the digital transmit beamformers that the former will use for transmission to the responder.

In a first step, similar to current training flows, the initiator signals within the MIMO Setup the analog beams combinations with which it will transmit sequentially during a second step. In this case it will set the decision maker to 0 to indicate to the responder that the latter is the decision maker. Enabling digital beamforming in addition to analog training can be done with the proposed structures by setting the Digital BF within the MIMO Control Setup to 1. Furthermore it sets the Digital BF-FBCK-Req within the MIMO FBCK Req to 1. This signals that it is the responder which will need to do the digital beamforming computations. In MIMO FBCK Request it may indicate the required number of taps that the precoding filter may have e.g., Ntaps_b=1, and number of bits for quantization.

In a second step, in each BRP packet the initiator transmits with one or more combinations of analog beams $(P_A^{i_1}, \ldots P_A^{i_N})$ with N and beam indexes indicated within the MIMO setup frame. Each of the BRP packets is received by the responder with corresponding analog beams $(W_A^{i_1}, \ldots W_A^{i_N})$. For each combination $(P_A^{i_j}, W_A^{i_j})$ the effective channel is estimated, a metric is computed (e.g., MMSE, capacity) and a digital beamformer $(P_{BD}^{i_j})$ is computed by the responder e.g., by using the methods described above. Alternatively the channel information can be saved and the beamformer computation can be performed only for the $(P_A^*, W_A^*)$ which achieves the best metric, e.g., the lowest MMSE or highest capacity.

In a third step, the MIMO feedback frame (MF) contains the indizes of the best sector for the initiator $(W_A^*)$. Additionally, the corresponding digital BF matrix $P_{BD}$ is fed back in the MIMO feedback, according to the format specified within the MIMO Fbck Request and having a form as proposed within Table 3.

If feedback was requested but is not present within the feedback frame, then the initiator may send a renewed digital beamforming request in BRP frame with the best analog beam combination and training sequences attached, which are sent with these best analog beams, thus to enable the computation of the digital beamformer at the responder. This frame can be sent as standalone or aggregated to the MIMO feedback for the responder link or simply training sequences can be sent attached to the MIMO feedback for the responder link. If feedback was requested but is not present but the responder recommends to not use the digital beamformer for the particular channel realization, the initiator may choose not to send a renewed request.

Figure 5:
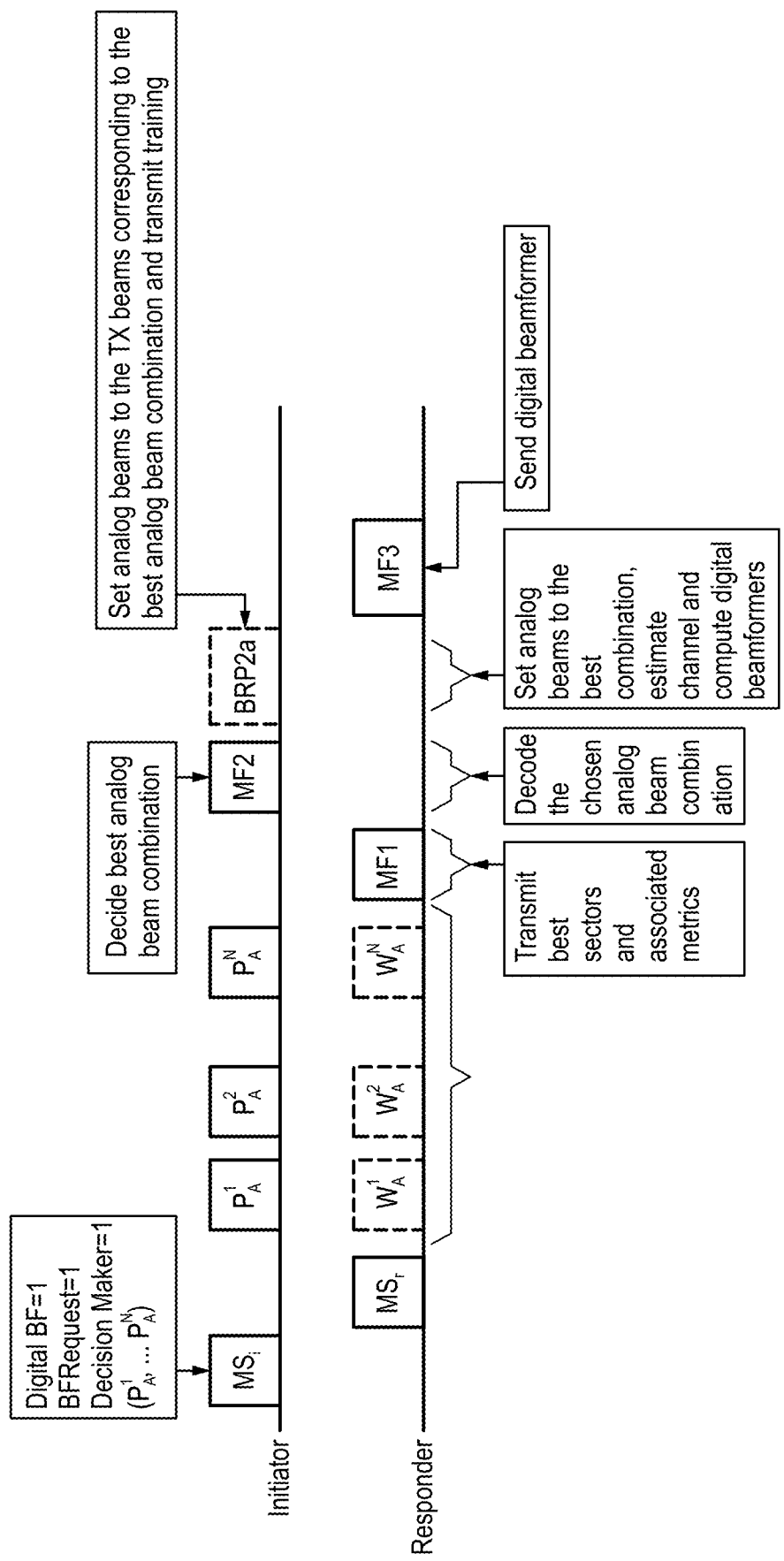
FIG. 5 shows a diagram illustrating a second exemplary embodiment of the operations of communication methods according to the present disclosure.

In a second exemplary embodiment illustrated in FIG. 5 the initiator wants to train the analog and digital beamformers for the initiator to responder link. In this example it is assumed that the decision maker for the initiator link is the initiator and that the initiator relies on the responder's receiver to compute and feedback the digital transmit beamformers that the former will use for transmission to the responder.

Steps 1 and 2 are similar to the first example. However, since the initiator is the decision maker for the initiator to responder link it requires in the first MIMO feedback (MF1 block) the computed metrics for the selected analog sectors indicated within the MIMO Setup, together with the indexes for the corresponding sectors. The responder may signal if digital beamforming information is ready or a retransmission with the best analog beams is required. Based on these the initiator computes the best combination and feeds back to the responder during MF2.

To allow the responder to compute the beamformers TRN sequences may be appended to MF2 or BRP frame can be aggregated which has TRN sequences attached. These allow the channel estimation at the responder and the computation of the digital beamformers for the analog link chosen by the initiator (W_A^*, P_A^*) as described above. During MF3 the responder feeds back the computed matrix or requests retransmission with the analog beams.

The capabilities may be signaled in the following format:

for each TRN unit. These matrices are sent back from the responder to the initiator as part of the MIMO feedback frame 604.

Figure 6:
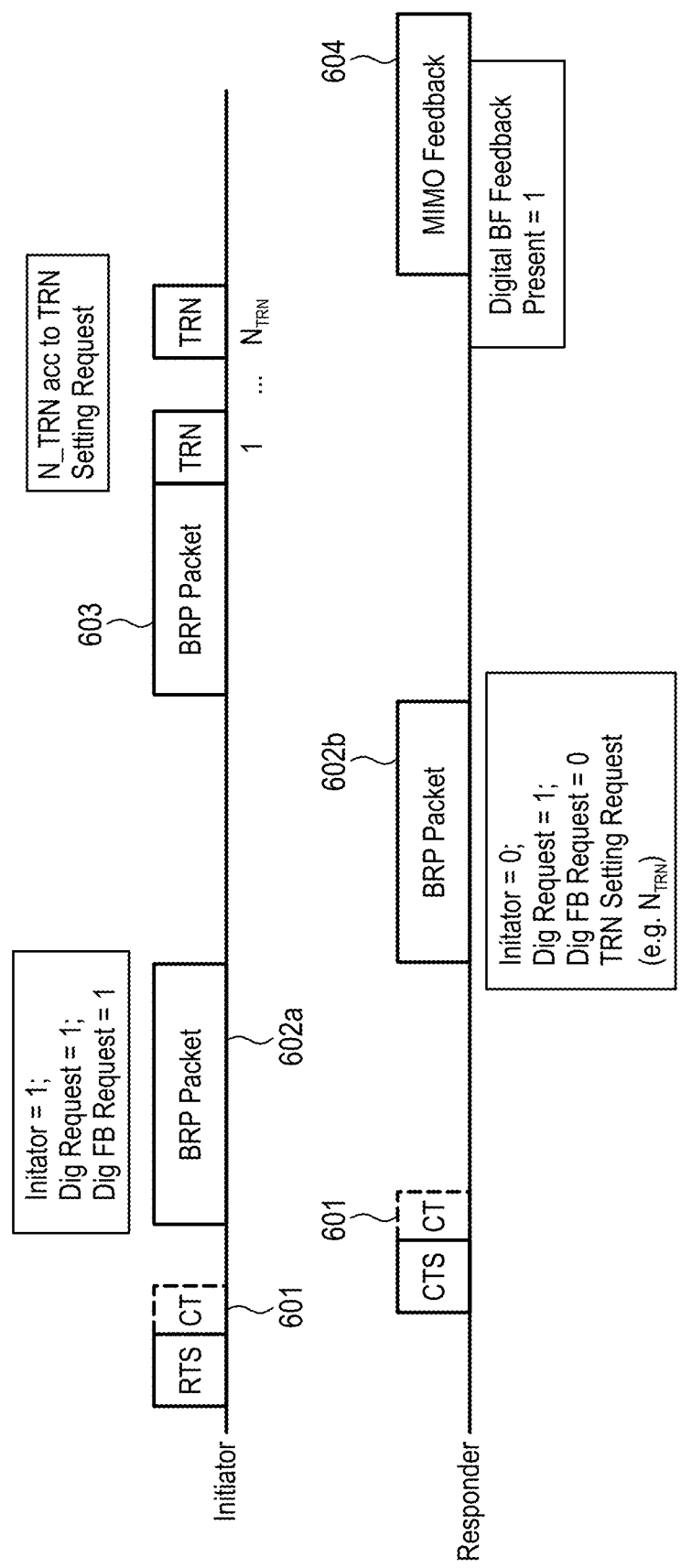
FIG. 6 shows a diagram illustrating the operations of digital training after RTS/CTS exchange with acknowledgement.
Figure 7:
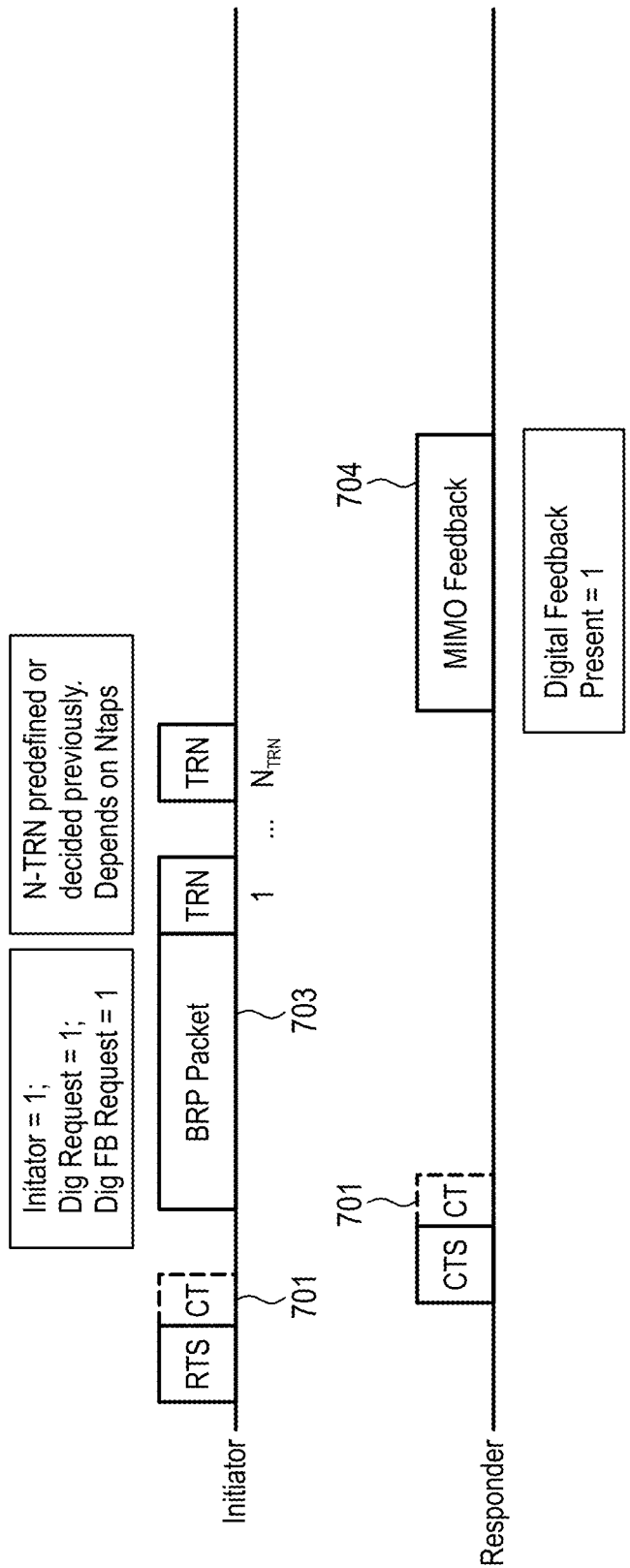
FIG. 7 shows a diagram illustrating the operations of digital training after RTS/CTS exchange without acknowledgement.

FIG. 7 shows a diagram illustrating the operations of digital beamforming training after RTS/CTS without acknowledgement. In contrast to FIG. 6, BRP packets 602*a* and 602*b* are not transmitted. It shows particularly an example of a hybrid BF phase when the AWV configuration is in RTS/CTS and number of TRN units $N_{TRN}$ is defined in a previous stage, e.g. during RTS/CTS, or is fixed to a standard value, e.g. depending on a number of taps resolution, a number of RF chains and/or a number of transmit streams. In this case the RTS/CTS contains a precise indication (e.g. included in control trailer CT 701) that the following transmission is for digital beamforming training. In more detail, after RTS/CTS exchange, BRP packet 703 is transmitted from initiator to responder which is appended by $N_{TRN}$ TRN units. During reception of the BRP packet 703, the responder estimates the channel $H_{eff}$ and computes feedback matrices for each TRN unit. These matrices are sent back from responder to initiator as part of the MIMO feedback frame 704.

|  | B0 B4 Requested BRP SC Blocks | B5 MU-MIMO Supported | B6 SU-MIMO Supported | B7 Grant Required | B8 NoRSS Supported | Digital TX BF Supported | Digital RX BF Type | Reserved |
|---|---|---|---|---|---|---|---|---|
| Bits: | 5 | 1 | 1 | 1 | 1 |  |  |  |

Digital TX BF Supported may be set to 1 if it can compute the transmit BFs, if it can apply FIR or just constant coefficient multiplications and if FIR applied which is the supported length. Optionally, if the receiver does not have the capability to compute the transmit beamforming coefficients, then it should feedback to the transmitter the type of equalizer used and the corresponding parameters. If transmitting this information is undesired, a default equalizer can be defined and this will be used in the derivation of the precoding matrices.

Figure 8:
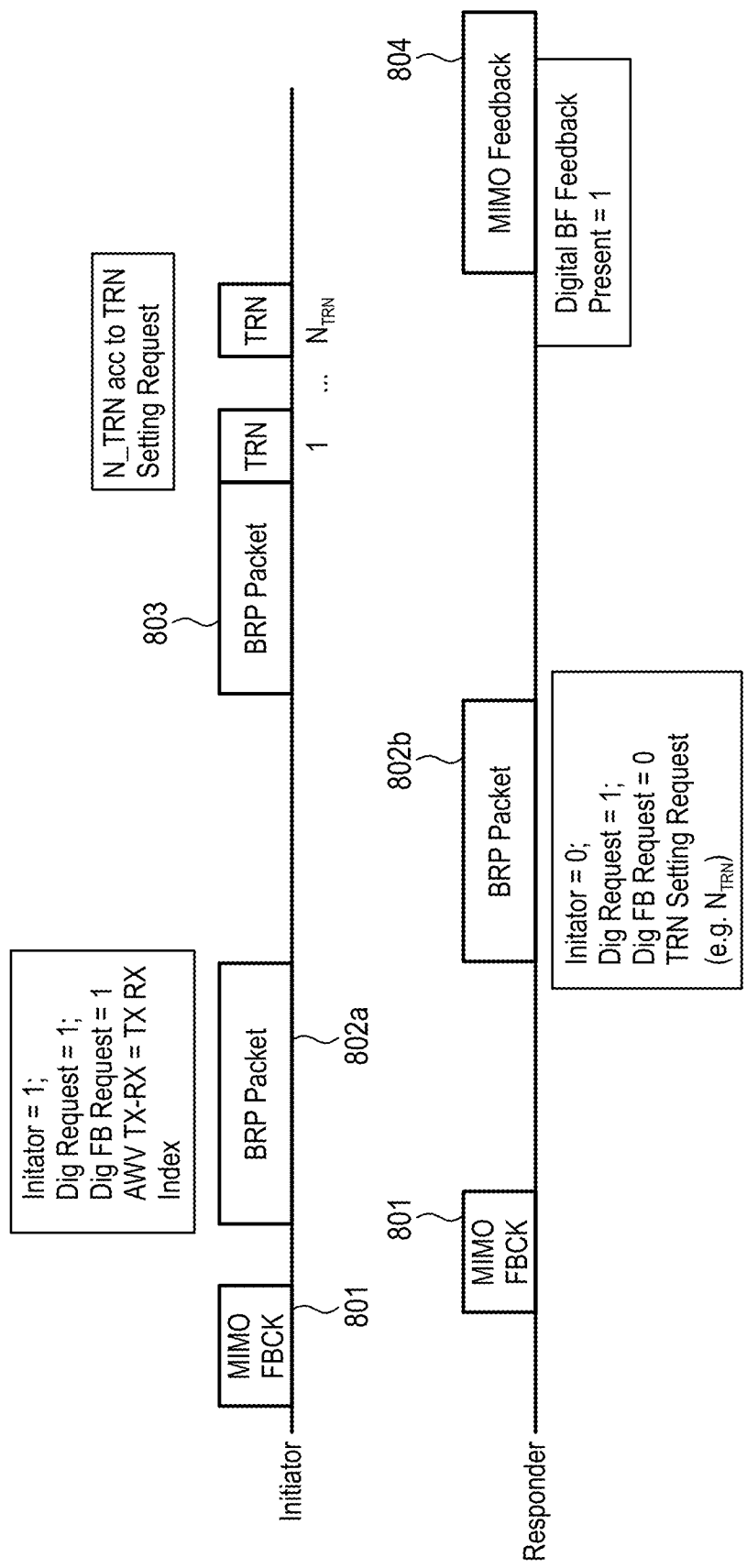
FIG. 8 shows a diagram illustrating the operations of digital beamforming without RTS/CTS exchange directly after analog BF training and with acknowledgement.

FIG. 6 shows a diagram illustrating the operations of digital beamforming training after RTS/CTS (request to send/clear to send) with acknowledgement. It shows particularly an example of a hybrid BF phase to compute the digital beamforming information for the initiator link (in the direction from the initiator (sending) to the responder (receiving)) when the AWV (antenna weight vector) configuration is included in RTS/CTS and the responder chooses the TRN configuration for digital beamforming training. In this case the analog beamformers (e.g. AWVs) for which the digital beamforming information is computed is set to the one indicated within the control trailer CT 601 of the RTS/CTS. For BF training BRP packets 602*a* and 602*b* are transmitted. The purpose of the BRP packet 602*b* from the responder is to acknowledge that it is ready to perform the computation of the digital beamforming information and to optionally request a number of TRN units ($N_{TRN}$) to allow it to estimate the effective channel with a desired precision and based on which the digital beamforming information can be computed. In more detail, after the initiator has received the BRP packet 602*b*, it transmits a BRP packet 603 to the responder which is appended by $N_{TRN}$ TRN units. During reception of the BRP packet 603, the responder estimates the channel $H_{eff}$ and computes feedback matrices FIG. 8 shows a diagram illustrating the operations of digital beamforming directly after analog beamforming training. It shows particularly an example of a hybrid BF phase when the AWV configuration which was chosen based on the analog beamforming feedback information is included in the BRP frame 802*a*. In this case, the BRP frame 802*a* includes a field within the BRP request stating the TX RX sector combination which has been chosen as part of the latest MIMO analog beamforming training. Within the same BRP frame 802*a*, the BRP request additionally contains the digital BF request, whereas the DMG refinement element contains the digital BF feedback request. This allows starting the digital beamforming training directly after the analog beamforming training without contending for the medium (and requiring RTS/CTS exchange 601 and 701). This requires a one bit indication in the MIMO FBCK 801 or a description within a standard exposing the hybrid BF protocol, to specify the time interval after the MIMO FBCK 801 reception that the initiator sends one or more BRP requests 802*a* for the digital beamforming.

In more detail, after MIMO FBK exchange 801 which is to identify the AWV configuration used for analog beamforming, the initiator sends a BRP packet 802*a* to the responder holding a request for digital beamforming training as in 602*a* and includes additionally AWV index used for subsequent (e.g. after BRP packet 802*a*) frame exchange. The AWV index added in the BRP packet 802*a* makes the RTS/CTS exchange with control trailer (601 or 701) obsolete. After having received the BRP packet 802*a*, the responder transmits a BRP request 802*b* similarly to 602*b* indicating readiness to compute digital beamforming information and optionally TRN parameters such as number of TRNs to be used in next BRP packet 803, e.g. $N_{TRN}$. After the initiator has received the BRP packet 802*b*, it transmits a BRP packet (803) to the responder which is appended by $N_{TRN}$ TRN units. During reception of the BRP packet 803, the responder estimates the channel $H_{eff}$ and computes feedback matrices for each TRN unit. These matrices are sent back from responder to initiator as part of the MIMO feedback frame 804.

The proposed communication devices are generally capable to perform digital beamforming, wherein the digital beamforming will be performed during the MIMO beamforming training, additional to analog beamforming training. The devices are further able to indicate both, wherein the ability to perform beamforming is preferably indicated in the capabilities field whereas the performing of digital beamforming during the MIMO beamforming training is preferably indicated in the setup frame or in beamforming refinement frames sent during the analog training.

In an embodiment the beamforming information is computed at the responder. However, other solutions can be devised in which the initiator computes the beamforming information according to channel information which is fed back by the responder. Hence, a flexible way of signaling may be provided.

Further, in an embodiment a predetermined metric is used and values of a predetermined metric are computed. Hereby, a predetermined metric is a metric based on which the best combination of analog beams is chosen. The digital beamforming information and the digital beamformers are not necessarily computed based on this metric.

The present disclosure presents a solution to a practical problem appearing in mm-wave single carrier frequency domain equalization (SC FDE). The proposed solutions are preferably useful in mm-wave communication and avoid the drawbacks of known solutions, particularly regarding full CSI estimation.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A communication device for RF-based communication with another communication device, said communication device comprising:

digital beamforming circuitry (42) configured to perform digital beamforming based on digital beamforming information to obtain RF data streams, and analog beamforming circuitry (441, 442) configured to perform analog beamforming for the obtained RF data streams, wherein said analog beamforming circuitry is configured to perform analog beamforming training with the other communication device enabling the other communication device to compute the digital beamforming information corresponding to one or more combinations of analog beams used in said analog beamforming training, and wherein said digital beamforming circuitry is configured to receive the computed digital beamforming information and to use it for performing the digital beamforming.

2. The communication device as defined in embodiment 1, wherein said analog beamforming circuitry is configured to receive values of a predetermined metric computed by the other communication device for combinations of analog beams used in said analog beamforming training, to select the one or more best combinations of analog beams based on the values of the predetermined metric and transmit combination information indicating the selected one or more best combinations of analog beams and/or training sequences with a selected set of transmit analog beams to the other communication device enabling the other communication device to compute the digital beamforming information for the selected best combinations.

3. The communication device as defined in any preceding embodiment, wherein said analog beamforming circuitry is configured to receive channel information from the other communication device with respect to the channel during said analog beamforming training and to compute values of a predetermined metric for combinations of analog beams used in said analog beamforming training based on the received channel information.

4. The communication device as defined in any preceding embodiment, further comprising antenna circuitry (45) configured to transmit the obtained RF data streams using the analog beams formed by the analog beamforming circuitry, wherein said antenna circuitry is configured to transmit a (first) digital beamforming indicator indicating that digital beamforming can be performed by the communication device and/or a (second) digital beamforming indicator indicating that digital beamforming should be performed during and/or after analog (MIMO) beamforming training in addition to analog beamforming and/or to receive a (third) digital beamforming indicator indicating that digital beamforming can be performed by the other communication device and/or a (fourth) digital beamforming indicator indicating that digital beamforming should be performed during analog (MIMO) beamforming training in addition to analog beamforming.

5. The communication device as defined in any preceding embodiment, further comprising antenna circuitry (45) configured to transmit the obtained RF data streams using the analog beams formed by the analog beamforming circuitry, wherein said antenna circuitry is configured to transmit a decision indicator indicating if the computation of the digital beamforming information is to be made by the communication device or the other communication device and/or indicating if the selection of the one or more best combinations of analog beams during the analog beamforming training to be used for computation of the digital beamforming information is to be made by the communication device or the other communication device.

6. The communication device as defined in embodiment 4 and/or 5, further comprising antenna circuitry (45) configured to transmit the obtained RF data streams using the analog beams formed by the analog beamforming circuitry, wherein said antenna circuitry is configured to transmit said digital beamforming indicator, in particular said second digital beamforming indicator, and/or said decision indicator in a setup frame or in frames used during (or defined for) analog beamforming training.

7. The communication device as defined in any preceding embodiment, wherein said digital beamforming circuitry is configured to receive precoding information as digital beamforming information and to use said precoding information for precoding the RF data streams.

8. The communication device as defined in embodiment 7, further comprising antenna circuitry (45) configured to transmit the obtained RF data streams using the analog beams formed by the analog beamforming circuitry, wherein said antenna circuitry is configured to transmit a precoding indicator (also called digital beamforming control information or precoding control information or precoding parameter information) to the other communication device, said precoding indicator indicating the number of taps and/or the number of bits for quantization and/or the format of the precoding information.

9. The communication device as defined in any preceding embodiment, further comprising antenna circuitry (45) configured to transmit the obtained RF data streams using the analog beams formed by the analog beamforming circuitry, wherein said antenna circuitry is configured to embed precoding indication in a preamble or header of a frame of a transmit signal of the obtained RF data stream if at least a part of the said frame is transmitted with a digital precoding matrix applied.

10. A communication device for RF-based communication with another communication device, said communication device comprising:
  analog beamforming circuitry (511, 512) configured to perform analog beamforming training with the other communication device for determining analog beams for use in receiving said RF data streams, and
  digital beamforming computation circuitry (54) configured to compute digital beamforming information corresponding to one or more combinations of analog beams used in said analog beamforming training and to transmit the computed digital beamforming information to the other communication device enabling the other communication device to perform digital beamforming based on the digital beamforming information.

11. The communication device as defined in embodiment 10, wherein said digital beamforming computation circuitry is configured to compute values of a predetermined metric for combinations of analog beams used in said analog beamforming training, to select the one or more best combinations of analog beams based on the values of the predetermined metric and to compute the digital beamforming information for the selected one or more best combinations.

12. The communication device as defined in embodiment 10 or 11, wherein said digital beamforming computation circuitry is configured to determine channel information with respect to the channel during said analog beamforming training, to transmit said channel information to the other communication device enabling the other communication device to compute values of a predetermined metric for combinations of analog beams used in said analog beamforming training based on the channel information, to receive combination information indicating the selected one or more best combinations of analog beams from the other communication device and to compute the digital beamforming information for the selected one or more best combinations.

13. The communication device as defined in any one of embodiment 10 to 12, further comprising antenna circuitry (50) configured to receive RF data streams, wherein said antenna circuitry is configured to transmit a digital beamforming indicator indicating that digital beamforming can be performed by the communication device and/or that digital beamforming should be performed during MIMO beamforming training in addition to analog beamforming and/or to receive a digital beamforming indicator indicating that digital beamforming can be performed by the other communication device and/or that digital beamforming should be performed during MIMO beamforming training in addition to analog beamforming.

14. The communication device as defined in any one of embodiment 10 to 13, further comprising antenna circuitry (50) configured to receive RF data streams, wherein said antenna circuitry is configured to transmit the computed digital beamforming information in a feedback frame or in a frame used during (or defined for) analog beamforming training.

15. The communication device as defined in any one of embodiment 10 to 14, wherein said digital beamforming computation circuitry is configured to compute precoding information as digital beamforming information and to transmit said precoding information to the other communication device for precoding the RF data streams.

16. The communication device as defined in embodiment 15, wherein said digital beamforming computation circuitry is configured to use effective channel information in the frequency domain, in particular channel information obtained by frequency domain transformation or estimation of the analog beamformed channel, to derive time-domain beamforming coefficients as digital beamforming information, in particular beamforming coefficients as part of the digital beamforming information.

17. The communication device as defined in embodiment 16, wherein said digital beamforming computation circuitry is configured to compute a precoding matrix as precoding information, in particular wherein the computed precoding matrix satisfies Karush-Kuhn-Tucker optimality conditions of a sum-rate optimization with power constraints or the precoding indication corresponds to the closest matrix in point of an Euclidean distance or chordal distance to a digital beamforming computed based on eigenvectors of the frequency domain channel matrices for the available frequencies or the precoding matrix corresponds to an eigenvector of a channel covariance matrix computed over all available frequencies.

18. A communication method for RF-based communication with another communication device, said communication method comprising:
performing digital beamforming based on digital beamforming information to obtain RF data streams, and
performing analog beamforming for the obtained RF data streams,
wherein said analog beamforming includes performing analog beamforming training with the other communication device enabling the other communication device to compute the digital beamforming information corresponding to one or more combinations of analog beams used in said analog beamforming training, and wherein said digital beamforming includes receiving the computed digital beamforming information and using it for performing the digital beamforming.

19. A communication method for RF-based communication with another communication device, said communication method comprising:
performing analog beamforming training with the other communication device for determining analog beams for use in receiving said RF data streams,
computing digital beamforming information corresponding to one or more combinations of analog beams used in said analog beamforming training, and
transmitting the computed digital beamforming information to the other communication device enabling the other communication device to perform digital beamforming based on the digital beamforming information.

20. A non-transitory computer-readable recording medium that stores therein a computer program product, which, when executed by a processor, causes the method according to embodiment 18 or 19 to be performed.

21. A computer program comprising program code means for causing a computer to perform the steps of said method according to embodiment 18 or 19 when said computer program is carried out on a computer.

22. The communication device as defined in any one of embodiments 1 to 17, wherein the digital beamforming information comprises one time-domain combining matrix or a FIR filter, whose components are derived based on channel information in frequency domain, for a chosen analog beam combination.

23. The communication device as defined in any one of embodiments 1 to 17, further comprising antenna circuitry configured to embed information in the preamble/header of a frame in the transmit signal if the current frame is transmitted with a digital precoding matrix applied so that the receiver can then adapt its demodulation accordingly and knows if a proposed precoding is applied.

24. The communication device as defined in any one of embodiments 1 to 9, further comprising antenna circuitry (45) configured to transmit the obtained RF data streams using the analog beams formed by the analog beamforming circuitry, wherein said antenna circuitry is configured to apply single carrier modulation for transmitting data and/or the other communication device is configured to apply single carrier frequency domain equalization for receiving data.

25. The communication device as defined in any one of embodiments 1 to 9, further comprising antenna circuitry (45) configured to transmit the obtained RF data streams using the analog beams formed by the analog beamforming circuitry, wherein said antenna circuitry is configured to receive precoding information in the form of beamforming coefficients of each data streams to each transmit antenna.

26. The communication device as defined in any one of embodiments 1 to 9, further comprising antenna circuitry (45) configured to transmit the obtained RF data streams using the analog beams formed by the analog beamforming circuitry, wherein said antenna circuitry is configured to receive precoding information in the form of beamforming coefficients of each data streams to each transmit antenna for multiple taps and corresponding delay information between the taps.

27. A communication device for RF-based communication with another communication device, said communication device comprising:
digital beamforming circuitry configured to perform digital beamforming based on digital beamforming information to obtain RF data streams, and
analog beamforming circuitry configured to perform analog beamforming for the obtained RF data streams,
wherein said analog beamforming circuitry is configured to perform analog beamforming training with the other communication device enabling the communication device to compute the digital beamforming information corresponding to one or more combinations of analog beams used in said analog beamforming training, and wherein said digital beamforming circuitry is configured to use the computed digital beamforming information for performing the digital beamforming.

28. The communication device as defined in any one of embodiments 1 to 17, wherein the digital beamforming information is computed and used as time domain information, in particular for single carrier transmission.

The invention claimed is:

1. A communication device for Radio Frequency (RF)-based communication with another communication device using single carrier transmission, said communication device comprising:
digital beamforming circuitry configured to perform digital beamforming based on digital beamforming information to obtain RF data streams,
analog beamforming circuitry configured to perform analog beamforming for the obtained RF data streams and to perform analog beamforming training with the other communication device, and
antenna circuitry configured to transmit or receive a decision indicator indicating if computation of the digital beamforming information is to be made by the communication device or the other communication device and to use the computed digital beamforming information for performing the digital beamforming, wherein the digital beamforming information is computed and used as time domain information.

2. The communication device as claimed in claim 1,
wherein said analog beamforming circuitry is configured to
receive values of a predetermined metric computed by the other communication device for combinations of analog beams used in said analog beamforming training, select the one or more best combinations of analog beams based on the values of the predetermined metric and transmit combination information indicating the selected one or more best combinations of analog beams and/or training sequences with a selected set of transmit analog beams to the other communication device enabling the other communication device to compute the digital beamforming information for the selected best combinations, or
transmit values of a predetermined metric computed by the communication device for combinations of analog beams used in said analog beamforming training, and receive combination information indicating one or more best combinations of analog beams and/or training sequences selected by the other communication device with a selected set of receive analog beams from the other communication device enabling the communication device to compute the digital beamforming information for the selected best combinations.

3. The communication device as claimed in claim 2, wherein said antenna circuitry is further configured to transmit the obtained RF data streams using the analog beams formed by the analog beamforming circuitry, wherein said antenna circuitry is configured to transmit or receive a decision indicator indicating if the selection of the one or more best combinations of analog beams during the analog beamforming training to be used for computation of the digital beamforming information is to be made by the communication device or the other communication device.

4. The communication device as claimed in claim 1, wherein said analog beamforming circuitry is configured to
receive channel information from the other communication device with respect to the channel during said analog beamforming training and to compute values of a predetermined metric for combinations of analog beams used in said analog beamforming training based on the received channel information, or
transmit channel information to the other communication device with respect to the channel during said analog beamforming training, the other communication device configured to compute values of a predetermined metric for combinations of analog beams used in said analog beamforming training based on the transmitted channel information.

5. The communication device as claimed in claim 1, wherein said antenna circuitry is configured to
transmit the obtained RF data streams using the analog beams formed by the analog beamforming circuitry, and
transmit a digital beamforming indicator indicating that digital beamforming can be performed by the communication device and/or a digital beamforming indicator indicating that digital beamforming should be performed during and/or after analog beamforming training in addition to analog beamforming and/or to receive a digital beamforming indicator indicating that digital beamforming can be performed by the other communication device and/or a digital beamforming indicator indicating that digital beamforming should be performed during analog beamforming training in addition to analog beamforming.

6. The communication device as claimed in claim 5, wherein said antenna circuitry is configured to transmit or receive said digital beamforming indicator and/or said decision indicator in a setup frame or in frames used during analog beamforming training.

7. The communication device as claimed in claim 1, wherein said antenna circuitry is configured to transmit or receive said decision indicator in a setup frame or in frames used during analog beamforming training.

8. The communication device as claimed in claim 1, wherein said digital beamforming circuitry or the other communication device is configured to receive precoding information as digital beamforming information and to use said precoding information for precoding the RF data streams.

9. The communication device as claimed in claim 8, wherein said antenna circuitry configured to
transmit the obtained RF data streams using the analog beams formed by the analog beamforming circuitry, and
transmit a precoding indicator to the other communication device or receive a precoding indicator from the other communication device, said precoding indicator indicating the number of taps and/or the number of bits for quantization and/or the format of the precoding information.

10. The communication device as claimed in claim 1, wherein said antenna circuitry configured to
transmit the obtained RF data streams using the analog beams formed by the analog beamforming circuitry,
embed precoding indication in a preamble or header of a frame of a transmit signal of the obtained RF data stream if at least a part of the said frame is transmitted with a digital precoding matrix applied.

11. A communication device for Radio Frequency (RF)-based communication with another communication device using single carrier transmission, said communication device comprising:
analog beamforming circuitry configured to perform analog beamforming training with the other communication device for determining analog beams for use in receiving said RF data streams,
digital beamforming computation circuitry configured to perform digital beamforming based on digital beamforming information, and
antenna circuitry configured to transmit or receive a decision indicator indicating if computation of the digital beamforming information is to be made by the communication device or the other communication device and to use the computed digital beamforming information for performing the digital beamforming, wherein the digital beamforming information is computed and used as time domain information.

12. The communication device as claimed in claim 11, wherein said digital beamforming computation circuitry of the communication device or the other communication device is configured to compute values of a predetermined metric for combinations of analog beams used in said analog beamforming training, to select the one or more best combinations of analog beams based on the values of the predetermined metric and to compute the digital beamforming information for the selected one or more best combinations.

13. The communication device as claimed in claim 11, wherein
said digital beamforming computation circuitry is configured to determine channel information with respect to the channel during said analog beamforming training, to transmit said channel information to the other communication device enabling the other communication device to compute values of a predetermined metric for combinations of analog beams used in said analog beamforming training based on the channel information, to receive combination information indicating the selected one or more best combinations of analog beams from the other communication device and to compute the digital beamforming information for the selected one or more best combinations, or
the other communication device is configured to determine channel information with respect to the channel during said analog beamforming training, to transmit said channel information to the communication device enabling the communication device to compute values of a predetermined metric for combinations of analog beams used in said analog beamforming training based on the channel information, to receive combination information indicating the selected one or more best combinations of analog beams from the communication device and to compute the digital beamforming information for the selected one or more best combinations.

14. A communication device for RF-based communication with the communication device as claimed in claim 11,
wherein the antenna circuitry is configured to
receive RF data streams, and
transmit a digital beamforming indicator indicating that digital beamforming can be performed by the communication device and/or that digital beamforming should be performed during multiple-in multiple-out (MIMO) beamforming training in addition to analog beamforming and/or to receive a digital beamforming indicator indicating that digital beamforming can be performed by the other communication device and/or that digital beamforming should be performed during MIMO beamforming training in addition to analog beamforming.

15. The communication device as claimed in claim 14,
wherein the antenna circuitry configured to
receive RF data streams, and
transmit or receive the computed digital beamforming information in a feedback frame or in a frame used during analog beamforming training.

16. The communication device as claimed in claim 11, wherein
said digital beamforming computation circuitry is configured to
compute precoding information as digital beamforming information and to transmit said precoding information to the other communication device for precoding the RF data streams, or
receive digital beamforming information from the other communication including precoding information for precoding the RF data streams.

17. The communication device as claimed in claim 16,
wherein said digital beamforming computation circuitry or the other communication device is configured to use effective channel information in the frequency domain to derive time-domain beamforming coefficients as digital beamforming information.

18. The communication device as claimed in claim 17,
wherein said digital beamforming computation circuitry or the other communication device is configured to compute a precoding matrix as precoding information, in particular wherein the computed precoding matrix satisfies Karush-Kuhn-Tucker optimality conditions of a sum-rate optimization with power constraints or the precoding indication corresponds to the closest matrix in point of an Euclidean distance or chordal distance to a digital beamforming computed based on eigenvectors of the frequency domain channel matrices for the available frequencies or the precoding matrix corresponds to an eigenvector of a channel covariance matrix computed over all available frequencies.

19. A communication method for Radio Frequency (RF)-based communication with another communication device using single carrier transmission, said communication method comprising:
performing digital beamforming based on digital beamforming information to obtain RF data streams, and
performing analog beamforming for the obtained RF data streams including performing analog beamforming training with the other communication device
enabling the communication device or the other communication device to compute the digital beamforming information corresponding to one or more combinations of analog beams used in said analog beamforming training, wherein
said digital beamforming includes computing digital beamforming information or receiving computed digital beamforming information from the other communication device and using the computed digital beamforming information for performing the digital beamforming, and
the digital beamforming information is computed and used as time domain information.

20. A non-transitory computer-readable recording medium that stores therein a computer program product, which, when executed by a processor, causes the method according to claim 19 to be performed.

21. A communication method for Radio Frequency (RF)-based communication between communication devices using single carrier transmission, said communication method comprising:
performing analog beamforming training between the communication devices for determining analog beams for use in receiving said RF data streams,
computing digital beamforming information corresponding to one or more combinations of analog beams used in said analog beamforming training, and
transmitting the computed digital beamforming information from a first communication device of the communication devices computing the digital beamforming information to a second communication device of the communication devices to perform digital beamforming based on the digital beamforming information, wherein the digital beamforming information is computed and used as time domain information.

22. A communication device for Radio Frequency (RF)-based communication with another communication device using single carrier transmission, said communication device comprising:
digital beamforming circuitry configured to perform digital beamforming based on digital beamforming information to obtain RF data streams, and
analog beamforming circuitry configured to perform analog beamforming for the obtained RF data stream, and
antenna circuitry configured to transmit a digital beamforming indicator indicating that digital beamforming can be performed by the communication device and/or a digital beamforming indicator indicating that digital beamforming should be performed during and/or after analog beamforming training in addition to analog beamforming and/or to receive a digital beamforming indicator indicating that digital beamforming can be performed by the other communication device and/or a digital beamforming indicator indicating that digital beamforming should be performed during analog beamforming training in addition to analog beamforming, wherein the digital beamforming information is computed and used as time domain information.

* * * * *